(12) United States Patent
Ericsson et al.

(10) Patent No.: US 7,950,318 B2
(45) Date of Patent: May 31, 2011

(54) DRIVER FOR A TWIN CUTTING DEVICE WITH COUNTER-ROTATING BLADES

(75) Inventors: Hans Ericsson, Kalmar (SE); Pankaj Bhukhanwala, Hamilton (BM); Niraj Bhukhanwala, legal representative, Mumbai (IN)

(73) Assignee: Indocean Diamond Tools (Bermuda) Ltd., Hamilton (BM)

( * ) Notice: Subject to any disclaimer, the term of this patent is extended or adjusted under 35 U.S.C. 154(b) by 694 days.

(21) Appl. No.: 11/665,225

(22) PCT Filed: Oct. 14, 2005
(Under 37 CFR 1.47)

(86) PCT No.: PCT/SE2005/001542
§ 371 (c)(1),
(2), (4) Date: May 6, 2008

(87) PCT Pub. No.: WO2006/041407
PCT Pub. Date: Apr. 20, 2006

(65) Prior Publication Data
US 2009/0199416 A1    Aug. 13, 2009

(30) Foreign Application Priority Data
Oct. 14, 2004   (SE) ...................................... 0402479

(51) Int. Cl.
*B26D 5/08* (2006.01)
(52) U.S. Cl. ................ 83/578; 83/599; 83/600; 83/618; 83/495; 83/698.41
(58) Field of Classification Search ..................... 83/578, 83/599, 600, 618, 495, 508.1, 607, 477.2, 83/514, 698.41, 602, 603, 628, 629, 581; 30/265, 206, 205, 240; 74/52; 475/10
See application file for complete search history.

(56) References Cited

U.S. PATENT DOCUMENTS

| | | | |
|---|---|---|---|
| 1,770,240 A | 7/1930 | Magnuson | |
| 2,443,027 A * | 6/1948 | Dishmaker | 30/206 |
| 2,555,428 A * | 6/1951 | Tuttle | 30/369 |
| 2,757,453 A | 8/1956 | Brunson | |
| 2,953,852 A | 9/1960 | Dehn | |
| 4,215,451 A * | 8/1980 | Wikoff | 452/133 |
| 4,245,516 A * | 1/1981 | Day | 74/52 |
| 4,987,732 A * | 1/1991 | Terai et al. | 56/255 |
| 5,010,717 A * | 4/1991 | Nakamura et al. | 56/17.6 |
| 6,076,265 A * | 6/2000 | Huang Lo | 30/265 |

\* cited by examiner

*Primary Examiner* — Boyer D Ashley
*Assistant Examiner* — Omar Flores-Sánchez

(57) ABSTRACT

The invention relates to a driver (1) for a twin cutting device (2), which comprises a first blade (4), which is non-rotatably arranged on a drive shaft (11) to be rotated about an axis of rotation (r) in a first direction, and a second blade (3), which is non-rotatably arranged on a drive socket (15), which encloses the drive shaft (11), to be rotated about the same axis of rotation (r) in a second direction opposite to said first direction. The drive shaft (11) constitutes a driving central shaft in a gear (10), which comprises a sun wheel (24), which is non-rotatably arranged on the drive shaft (11) to be rotated by the same, at least a first planet wheel (25), which meshes with the sun wheel (24) and is rotatable about an axis (p) parallel to the axis of rotation (r), at least a second planet wheel (29), which is arranged to rotate simultaneously with the first planet wheel (25), and a gear rim (30), which with internal teeth meshes with the second planet wheel (29) and is non-rotatably mounted on the drive socket (15) to rotate the same.

19 Claims, 1 Drawing Sheet

DRIVER FOR A TWIN CUTTING DEVICE WITH COUNTER-ROTATING BLADES

FIELD OF THE INVENTION

The present invention relates to a driver for a twin cutting device, which comprises a first blade, which is non-rotatably arranged on a drive shaft to be rotated about an axis of rotation in a first direction, a second blade, which is non-rotatably arranged on a drive socket, which encloses the drive shaft, to be rotated about the same axis of rotation in a second direction opposite to said first direction, the two blades extending parallel to and close to each other, and a drive motor which is arranged to drive both the drive shaft and the drive socket.

BACKGROUND ART

A driver according to the preamble is disclosed in, for example, WO 89/12522. In a manner typically for most prior-art drivers, it comprises conical gear wheels for the necessary reversal of direction between the drive shaft and the drive socket.

A drawback of a solution comprising conical gear wheels is that the intermediate wheel, which is perpendicularly arranged relative to the driving and the driven gear wheel, requires relatively much space along the direction of the axis of rotation. This makes it difficult to use such a solution to provide a driver which is so compact that it can be connected, if desired in the form of an adapter, to, for example, an ordinary circular saw intended for only one blade.

DE 298 13 230 U1 discloses an alternative driver, which can also be read against the preamble. In this prior-art driver, cylindrical gear wheels are used in one embodiment instead of the above-mentioned conical gear wheels.

This is advantageous since the dimensions of the driver along the direction of the axis of rotation can be reduced to a considerable extent compared with the solution involving conical gear wheels. A drawback is, however, that instead the dimensions of the driver transversely to the direction of the axis of rotation increase since the cooperating cylindrical gear wheels are positioned radially side by side. Nor is the driver according to DE 298 13 230 U1 useful, for instance, for construction of an adapter as stated above.

OBJECT OF THE INVENTION

In view of the known solutions described above, the object of the present invention is to improve a driver according to the preamble so that a construction with reduced outer dimensions both along and transversely to the direction of the axis of rotation is made possible.

SUMMARY OF THE INVENTION

According to the invention, this object is achieved by a driver as described by way of introduction, by the drive shaft constituting a driving central shaft in a gear, and by said gear comprising a sun wheel, which is non-rotatably arranged on the drive shaft to be rotated by the same, at least a first planet wheel, which meshes with the sun wheel and is rotatable about an axis parallel to the axis of rotation, at least a second planet wheel, which is arranged to rotate simultaneously with the first planet wheel about the same axis, and a gear rim, which with internal teeth meshes with the second planet wheel and is non-rotatably mounted on the drive socket to rotate the same.

Due to a solution, in which a gear rim is used, which defines the radially outermost border of the moving parts of the gear, the radial dimensions can be reduced to a considerable extent compared with the above-mentioned DE 298 13 230 U1. In addition, also the axial dimensions can be reduced significantly compared with a traditional solution according to the above-mentioned Wo 89/12522, since the sun wheel and the first planet wheel extend in a plane parallel to the second planet wheel and the gear rim. Thus the invention makes it possible to construct, for instance, an adapter as stated above.

In the driver according to the invention, the second planet wheel is preferably arranged closer to the blades than the first planet wheel. The advantage of such positioning closer to the saw blades is above all that the drive socket does not have to extend over the sun wheel and the associated first planet wheel in order to reach the gear rim.

In the driver according to the invention, the gear suitably comprises a case, which is arranged to be fixedly connected to the motor and has a rear wall, through which the drive shaft extends and which supports a planet wheel shaft for said planet wheels. The advantage of the rear wall is that it constitutes a stationary structural element, from which the gear itself can be built in a simple and extremely mounting-friendly way.

Preferably, the rear wall has a recess, in which a roller bearing arranged on the drive shaft is mounted. It will be appreciated that also this solution adds to simplification of the construction since no separate bearing bracket is required and besides a roller bearing makes it very durable.

Said first and second planet wheels are preferably non-rotatably arranged on a common planet wheel shaft, which by means of a roller bearing is rotatably mounted in a recess in the rear wall. Also this solution constitutes a simple as well as durable construction alternative.

The case suitably has a jacket portion, which from the rear wall extends over at least said gear rim to protect it. The jacket portion helps in a simple manner to create a closed unit, the gear wheels of which are well protected. The rear wall is preferably formed as a circular-cylindrical disc, through the centre of which the drive shaft extends, and the jacket portion is preferably formed as a circular-cylindrical socket, which is movable over the rear wall and lockable to the same. The advantage of the latter variant is again the simplicity and mounting friendliness of the construction. Thus it is, for instance, possible to produce the rear wall in a lathe and, in lathing, provide it with a circumferential flange. This can then serve as a guide for the circular-cylindrical socket, said guide determining, in mounting, the position of the socket relative to the rear wall.

In a further variant, the jacket portion can be integrally formed with a blade guard. It will be appreciated that also this variant brings advantages in mounting since this makes it possible to reduce the number of necessary components.

Also the drive socket is preferably formed as an annular disc, through the centre of which the drive shaft extends and the outer diameter of which corresponds to the outer diameter of the gear rim. The advantage of this is that the assembly of the gear rim and drive socket is facilitated by the common outer diameter and by the solution involving a disc making it possible to produce the drive socket as a turned component, if desired.

Preferably also the drive socket has a central recess, in which a roller bearing arranged on the drive shaft is mounted. Also in this case the advantage is the simplification of the construction since no separate bearing bracket is required, and improved durability of the driver compared with the one afforded by, for instance, a slide bearing.

In a preferred embodiment, the gear rim is fastened to the drive socket by screws, which from the blades extend through the drive socket into the gear rim. Since the screws are inserted from the blade side of the driver, the gear rim need only be so thick that the narrow thread part of the screws and not their wide head part can be received. It will also be appreciated that a construction in two parts that are screwed together is relatively easy to produce, but also that a construction made in one piece is within the technically conceivable scope.

In the driver according to the invention, the gear ratio between the sun wheel and the first planet wheel suitably is between 2.5:1 and 4:1 and preferably is 3:1, and the gear ratio between the second planet wheel and the gear rim is between 1:2.5 and 1:4 and preferably is 1:3. With ratios in the ranges stated, it will be possible to provide a compact as well as robust driver, which satisfies all requirements that can reasonably be placed on, for instance, an adapter as stated above. However, it is important to point out that the gear ratio between the drive shaft and the drive socket need not necessarily be exactly 1:1, but that, of course, a gear ratio of near 1:1 is desirable.

Finally, two pairs of first and second planet wheels are arranged diametrically opposite one another in relation to the axis of rotation. The advantage of this is that such a solution, especially in the gear ratios stated above, constitutes an excellent compromise between the required technical efforts and durability.

BRIEF DESCRIPTION OF THE DRAWING

The accompanying drawing shows in FIG. 1 a preferred embodiment of a driver according to the invention in a schematic side view, some components being shown in section.

DESCRIPTION OF A PREFERRED EMBODIMENT

Figure 1:
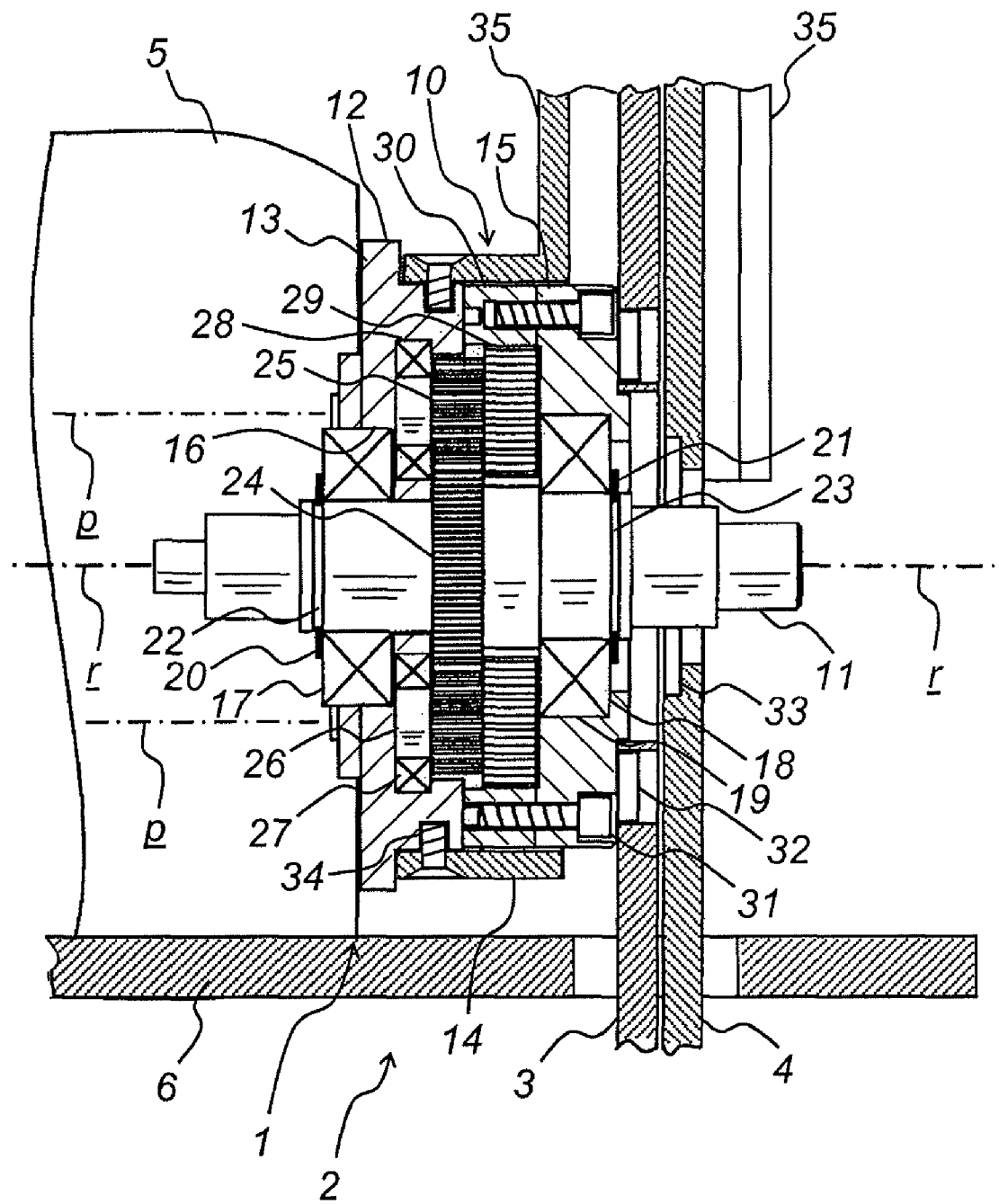

The invention will now be described in more detail by way of the preferred embodiment of a driver 1, as shown in FIG. 1, which is intended for a twin cutting device, which is generally designated 2.

In this context, a twin cutting device 2 relates to a cutting device which comprises a pair of circular blades 3, 4, which adjacent to one another rotate in opposite directions about a common axis of rotation r. The advantage of such cutting devices compared with cutting devices comprising only one blade is that the counter-rotating blades 3, 4 effectively eliminate motions of projections that would otherwise occur. The preferred embodiment shown in FIG. 1 is more specifically intended to exemplify an embodiment which is based on a traditional portable circular saw which has a motor 5 and a table 6 and which by means of an adapter-like driver 1 has been converted into a twin cutting device with two counter-rotating blades 3, 4.

The twin cutting device 2 shown in FIG. 1 thus has a table 6 which supports a motor 5. For mitring, the motor can, although this is not shown, be pivotable in relation to the table 6 about an axis positioned in the plane of the table and extending perpendicular to the above-mentioned direction of rotation. The motor 5 has a motor shaft (not shown) which is parallel to or set at an angle to said axis of rotation r and which preferably via a reduction gear drives a drive shaft 11 from the end which is to the left in FIG. 1.

The drive shaft 11 constitutes the central component of a gear 10, which has a case 12 docked to the motor 5. The case 12 includes a substantially plate-shaped rear wall 13 facing the motor 5, a jacket portion 14 connected to the wall 13 and, facing away from the motor 5, a substantially plate-shaped circular-cylindrical drive socket 15.

The rear wall 13 is circular-cylindrical and has a central recess 16, in which a roller bearing 17 is inserted. The drive shaft 11 extends through the roller bearing 17 into the case 12 and out of the same via a roller bearing 18, which is arranged in a central recess 19 in the drive socket 15. The roller bearings 17, 18 are held in place by locking rings 20, 21 which are inserted into grooves 22, 23 formed in the drive shaft 11 on opposite sides of the case 12.

A cylindrical sun wheel 24 is non-rotatably arranged on the drive shaft 11 in the case 12 and meshes with two first planet wheels 25 on opposite sides of the drive shaft 11. The first planet wheels 25 are non-rotatably arranged on a planet wheel shaft 26 each. These shafts are mounted in roller bearings 27, which are inserted in recesses 28 in the rear wall 13 and rotatable about axes p, which are parallel to the above-mentioned axis of rotation r. Also second planet wheels 29 are non-rotatably arranged on the planet wheel shafts 26 in such a manner that the first planet wheels 25 are positioned between them and the rear wall 13. The second planet wheels 29 in turn mesh with a circular-cylindrical gear rim 30, which has internal teeth and a smooth outside. The gear rim 30 has the same outer diameter as the drive socket 15 and is non-rotatably connected to the same by screws 31 which are screwed into the gear rim 30 from the drive socket 15.

For driving an inner saw blade 3, which in FIG. 1 is shown in section and only partially, the drive socket 15 has on its side facing the blade 3 and thus facing away from the gear 10 two driver pins 32, which engage in corresponding holes in the blade 3 and prevent rotation thereof relative to the drive socket. For the corresponding drive of an outer saw blade 4, which in FIG. 1 is shown in section and only partially, the drive shaft 11 has at its end facing the blade 4 and thus facing away from the gear 10 an inner blade holder 33, which is adapted to cooperate with an outer blade holder (not shown), such as a nut, by which the blade 4 is non-rotatably locked to the drive shaft 11 and by which besides the blade 3 is held on the drive socket 15.

In the embodiment illustrated, the jacket portion 14 of the case 12 consists of a circular-cylindrical sheet-metal tube which is slipped over the rear wall 13 and is fixed thereto by screws 34. In addition the jacket portion 14 is combined with a fixed upper blade guard 35 which in operation prevents unintentional contact with the rotating blades and chips thrown from the same. Of course, in addition to the fixed blade guard 35, a movable blade guard should in prior-art manner also be arranged, although such a guard is not shown in the drawing.

A person skilled in the art realises that the above-described driver can be varied in many ways within the scope of the appended claims and that the compact outer dimensions make it possible to combine the driver with various known or existing machines, such as circular saws and angle grinders.

The invention claimed is:

1. A driver for a twin cutting device, which comprises a first blade, which is non-rotatably arranged on a drive shaft to be rotated about an axis of rotation in a first direction, a second blade, which is non-rotatably arranged on a drive socket, which encloses the drive shaft, to be rotated about the same axis of rotation in a second direction opposite to said first direction, the two blades extending parallel to and close to each other, and a drive motor which is arranged to drive both the drive shaft and the drive socket, wherein the drive shaft constitutes a driving central shaft in a gear, and that said gear comprises a sun wheel, which is non-rotatably arranged on the drive shaft to be rotated by the same, at least a first planet wheel, which meshes with the sun wheel and is rotatable about an axis parallel to the axis of rotation, at least a second planet wheel, which is arranged to rotate simultaneously with the first planet wheel about the same axis, and a gear rim, which with internal teeth meshes with the second planet wheel and is non-rotatably mounted on the drive socket to rotate the same, wherein the gear comprises a case, which is arranged to be fixedly connected to the motor and has a rear wall, through which the drive shaft extends and which supports a planet wheel shaft for said planet wheels.

2. The driver as claimed in claim 1, wherein the second planet wheel is closer to the blades than the first planet wheel.

3. The driver as claimed in claim 2, wherein the drive socket is formed as an annular disc, through the centre of which the drive shaft extends and the outer diameter of which corresponds to the outer diameter of the gear rim.

4. The driver as claimed in claim 1, wherein the rear wall has a recess in which a roller bearing arranged on the drive shaft is mounted.

5. The driver as claimed in claim 4, wherein said first and second planet wheels are non-rotatably arranged on a common planet wheel shaft, which by means of a roller bearing is rotatably mounted in a recess in the rear wall.

6. The driver as claimed in claim 4, wherein the case has a jacket portion, which from the rear wall extends over at least said gear rim to protect it.

7. The driver as claimed in claim 1, wherein said first and second planet wheels are non-rotatably arranged on a common planet wheel shaft, which by means of a roller bearing is rotatably mounted in a recess in the rear wall.

8. The driver as claimed in claim 7, wherein the case has a jacket portion, which from the rear wall extends over at least said gear rim to protect it.

9. The driver as claimed in claim 1, wherein the case has a jacket portion, which from the rear wall extends over at least said gear rim to protect it.

10. The driver as claimed in claim 9, wherein the jacket portion is made in one piece with a blade guard.

11. The driver as claimed in claim 9, wherein the rear wall is formed as a circular-cylindrical disc, the drive shaft extends through the centre of the circular-cylindrical disc, and the jacket portion is formed as a circular-cylindrical socket that is movable over the rear wall and lockable to the rear wall.

12. The driver as claimed in claim 11, wherein the jacket portion is made in one piece with a blade guard.

13. The driver as claimed in claim 1, wherein the drive socket is formed as an annular disc, drive shaft extends through the centre of the annular disc, and an outer diameter of the annular disc corresponds to an outer diameter of the gear rim.

14. The driver as claimed in claim 13, wherein the gear rim is fastened to the drive socket by screws, and the screws extend through the drive socket into the gear rim.

15. The driver as claimed in claim 1, wherein the gear ratio between the sun wheel and the first planet wheel is between 2.5:1 and 4:1, and that the gear ratio between the second planet wheel and the gear rim is between 1:2.5 and 1:4.

16. The driver as claimed in claim 1, wherein two pairs of first and second planet wheels are arranged diametrically opposite one another in relation to the axis of rotation.

17. The driver as claimed in claim 1, wherein the drive socket is formed as an annular disc, through the centre of which the drive shaft extends and the outer diameter of which corresponds to the outer diameter of the gear rim.

18. A driver for a twin cutting device, which comprises a first blade, which is non-rotatably arranged on a drive shaft to be rotated about an axis of rotation in a first direction, a second blade, which is non-rotatably arranged on a drive socket, which encloses the drive shaft, to be rotated about the same axis of rotation in a second direction opposite to said first direction, the two blades extending parallel to and close to each other, and a drive motor which is arranged to drive both the drive shaft and the drive socket, wherein the drive shaft constitutes a driving central shaft in a gear, and that said gear comprises a sun wheel, which is non-rotatably arranged on the drive shaft to be rotated by the same, at least a first planet wheel, which meshes with the sun wheel and is rotatable about an axis parallel to the axis of rotation, at least a second planet wheel, which is arranged to rotate simultaneously with the first planet wheel about the same axis, and a gear rim, which with internal teeth meshes with the second planet wheel and is non-rotatably mounted on the drive socket to rotate the same, wherein the drive socket is formed as an annular disc, the drive shaft extends through the centre of the annular disc, and an outer diameter of the annular disc corresponds to an outer diameter of the gear rim, and wherein the drive socket has a central recess, in which a roller bearing arranged on the drive shaft is mounted.

19. A driver for a twin cutting device, which comprises a first blade, which is non-rotatably arranged on a drive shaft to be rotated about an axis of rotation in a first direction, a second blade, which is non-rotatably arranged on a drive socket, which encloses the drive shaft, to be rotated about the same axis of rotation in a second direction opposite to said first direction, the two blades extending parallel to and close to each other, and a drive motor which is arranged to drive both the drive shaft and the drive socket, wherein the drive shaft constitutes a driving central shaft in a gear, and that said gear comprises a sun wheel, which is non-rotatably arranged on the drive shaft to be rotated by the same, at least a first planet wheel, which meshes with the sun wheel and is rotatable about an axis parallel to the axis of rotation, at least a second planet wheel, which is arranged to rotate simultaneously with the first planet wheel about the same axis, and a gear rim, which with internal teeth meshes with the second planet wheel and is non-rotatably mounted on the drive socket to rotate the same, wherein the second planet wheel is closer to the blades than the first planet wheel, and wherein the gear comprises a case, which is arranged to be fixedly connected to the motor and has a rear wall, through which the drive shaft extends and which supports a planet wheel shaft for said planet wheels.

\* \* \* \* \*